US008185827B2

(12) United States Patent
Appleyard et al.

(10) Patent No.: US 8,185,827 B2
(45) Date of Patent: May 22, 2012

(54) ROLE TAILORED PORTAL SOLUTION INTEGRATING NEAR REAL-TIME METRICS, BUSINESS LOGIC, ONLINE COLLABORATION, AND WEB 2.0 CONTENT

(75) Inventors: James P. Appleyard, North Richland Hills, TX (US); Edwin J. Bruce, Corinth, TX (US); Romelia H. Flores, Keller, TX (US); Jason A. Salcido, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 11/925,419

(22) Filed: Oct. 26, 2007

(65) Prior Publication Data

US 2009/0113310 A1 Apr. 30, 2009

(51) Int. Cl.
*G06F 3/00* (2006.01)
(52) U.S. Cl. ....................................................... 715/751
(58) Field of Classification Search .................. 715/736, 715/751, 753, 760, 771–772
See application file for complete search history.

(56) References Cited

U.S. PATENT DOCUMENTS

| 6,854,107 | B2 | 2/2005 | Green et al. | |
|---|---|---|---|---|
| 7,158,940 | B2 | 1/2007 | Cimral et al. | |
| 7,343,550 | B2 * | 3/2008 | Saidenberg et al. | 715/736 |
| 7,398,471 | B1 * | 7/2008 | Rambacher et al. | 715/744 |
| 7,493,563 | B2 * | 2/2009 | Bohn et al. | 715/736 |
| 7,599,293 | B1 * | 10/2009 | Bain et al. | 370/235 |
| 2002/0054086 | A1 | 5/2002 | Van Oostenbrugge et al. | |
| 2002/0169852 | A1 | 11/2002 | Schaeck | |
| 2002/0198973 | A1 * | 12/2002 | Besaw | 709/223 |
| 2003/0014560 | A1 | 1/2003 | Mugica et al. | |
| 2003/0107596 | A1 | 6/2003 | Jameson | |
| 2004/0001565 | A1 | 1/2004 | Jones et al. | |
| 2004/0090969 | A1 | 5/2004 | Jerrard-Dunne et al. | |
| 2004/0093381 | A1 | 5/2004 | Hodges et al. | |
| 2004/0183831 | A1 | 9/2004 | Ritchy et al. | |
| 2004/0225955 | A1 | 11/2004 | Ly | |
| 2004/0249664 | A1 | 12/2004 | Broverman et al. | |

(Continued)

OTHER PUBLICATIONS

Harrop, Warren, Armitage, Grenville. Real-Time Collaborative Network Monitoring and Control Using 3D Game Engines for Representation and Interaction. VizSEC'06, Nov. 3, 2006, Alexandria, Virginia, USA.*

(Continued)

*Primary Examiner* — Thanh Vu
(74) *Attorney, Agent, or Firm* — Patents on Demand P.A.; Brian K. Buchheit; Scott M. Garrett

(57) ABSTRACT

The disclosed solution provides a tailored user experience available through a Web portal that addresses the multiple-view, multiple-data needs of operations, supervisory, policy making, and executive personnel of an organization. These various roles can all be concerned with measurement/assessment of an organization's compliance with performance targets, for which real-time, near real-time or other metrics are gathered. The metrics can be presented in a role tailored fashion to the portal users in near real-time along with federation of analysis and trend calculation output. Business logic can be applied to the federated data and near real-time metrics to automatically effectuate actions and/or to suggest responses when received metrics exceed previously established boundaries. Collaboration tools and Web 2.0 information sharing technologies can be integrated in the portal to facilitate rapid coordinated responses and to share information across the organization.

17 Claims, 8 Drawing Sheets

U.S. PATENT DOCUMENTS

| | | | |
|---|---|---|---|
| 2005/0114502 A1* | 5/2005 | Raden et al. | 709/224 |
| 2005/0125772 A1 | 6/2005 | Kohno | |
| 2005/0154701 A1 | 7/2005 | Parunak et al. | |
| 2005/0267789 A1 | 12/2005 | Satyadas et al. | |
| 2006/0150105 A1* | 7/2006 | Bright et al. | 715/736 |
| 2006/0174201 A1* | 8/2006 | Zaner-Godsey et al. | 715/736 |
| 2006/0184883 A1 | 8/2006 | Jerrard-Dunne et al. | |
| 2006/0235733 A1 | 10/2006 | Marks | |
| 2006/0294215 A1* | 12/2006 | Noble et al. | 709/223 |
| 2007/0011126 A1 | 1/2007 | Conner et al. | |
| 2007/0028175 A1* | 2/2007 | Moore et al. | 715/733 |
| 2007/0130561 A1 | 6/2007 | Siddaramappa et al. | |
| 2007/0169016 A1 | 7/2007 | Aakolk et al. | |
| 2007/0198312 A1 | 8/2007 | Bagchi et al. | |
| 2007/0203766 A1 | 8/2007 | Adler et al. | |
| 2008/0155424 A1* | 6/2008 | Moran et al. | 715/736 |
| 2009/0307596 A1* | 12/2009 | Allot | 715/736 |

OTHER PUBLICATIONS

"Interface for Creating Custom, End-User, Role Based Application Interface", Disclosure No. IPCOM13828D, IBM Corporation, Oct. 2000.

"SOA Workplace Portal: Emissions Dashboard", IBM Corp., Nov. 11, 2006.

Chen, I.Y., et al., "An SOA-based software deployment management system, "2006 IEEE/WIC/ACM Int'l Conf. on Web Intelligence, 2006.

Suri, J., et al., "Building Mashup Portlets," Sun Microsystems, Aug. 24, 2006.

"A Primer on Enterprise Mashups: Productivity Drivers for the Web 2.0 Application Style," Kapow Technologies, 2007.

* cited by examiner

FIG. 9

ROLE TAILORED PORTAL SOLUTION INTEGRATING NEAR REAL-TIME METRICS, BUSINESS LOGIC, ONLINE COLLABORATION, AND WEB 2.0 CONTENT

BACKGROUND

1. Field of the Invention

The present invention relates to the field of Web portal technologies and, more particularly, to a role tailored portal solution integrating near real-time metrics, business logic, online collaboration, and Web 2.0 content.

2. Description of the Related Art

Many organizations capture near real-time metrics, which are significant to an organization function. These metrics typically have a normal operation range within which no actions are required. When an operation range of the metrics exceeds established boundaries, however, decisive and rapid action is often demanded. In a large and/or distributed organization, response actions can involve numerous decisions of human agents at different management levels. Coordination among these human agents can be difficult, which can lengthen a situation response time, can result in costly miscommunications, can result in divergent understandings of a situation and/or a situation response, can cause improper reporting/documentation of a response, and the like.

Individual, non-integrated solutions exist that are designed to handle aspects of the above problem. For example, collaboration tools exist to facilitate communications among human agents. Software based monitoring tools exist to capture and distribute real-time metrics. Widgets exist to display metrics as gauges for easy consumption. These tools are presently scattered across different computing spaces, which are selectively available to decision makers in different forms. Different decision makers can have access to one or more of these tools. Different ones of the tools can execute upon different computing systems. No single information mechanism/system exists that can provide metric driven, time sensitive information to decision makers/action takers of a large distributed organization in a unified, easy to consume manner. Preexisting software tools fall short of the industry need to detect when real-time metrics exceed safe boundaries and to facilitate timely, coordinated responses among key organizational decision makers/action takers.

SUMMARY OF THE INVENTION

The disclosed solution provides a tailored user experience available through a Web portal that addresses the multiple-view, multiple-data needs of operations, supervisory, policy making, and executive personnel of an organization. These various roles can all be concerned with measurement/assessment of an organization's compliance with performance targets, for which real-time or near real-time metrics are gathered. The metrics can be presented in a role tailored fashion to the portal users in near real-time along with federation of analysis and trend calculation output. Business logic can be applied to the federated data and near real-time metrics to automatically effectuate actions and/or to suggest responses when received metrics exceed previously established boundaries, such as a safe operation range for a key performance indicator.

Collaboration tools and Web 2.0 information sharing technologies can be integrated in the portal to facilitate rapid coordinated responses and to share information across the organization. For example, online collaboration tools (e.g., instant messaging, online meeting tools, etc.) can automatically identify and/or suggest personnel to assist with a situation where metrics exceed safe operational boundaries. Web 2.0 tools can institutionalize data at many different levels, which can be searched and applied to assist with handling a metrics driven situation.

No known conventional tool leverages collaboration tools and/or Web 2.0 technologies within a portal to assist with responding to metrics driven situations, which often require rapid corrective actions be taken to ensure organizational assets are restored to a safe operating range as soon as possible. Gains achieved through integrated use of the collaboration tools and Web 2.0 technologies can be particularly valuable, as the severity of necessary corrective adjustments to restore assets to a safe operating range can geometrically expand as time from an incident causing a deviation increases. That is, continuously increasing adjustments can be required over time as a situation worsens (deviates from a safe operating range), which makes rapid and coordinated responses of critical import.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings embodiments which are presently preferred, it being understood, however, that the invention is not limited to the precise arrangements and instrumentalities shown.

FIG. 9 illustrates a role tailored emissions dashboard portal configured for an executive level user role in accordance with an embodiment of the inventive arrangements disclosed herein.

DETAILED DESCRIPTION OF THE INVENTION

Figure 1:
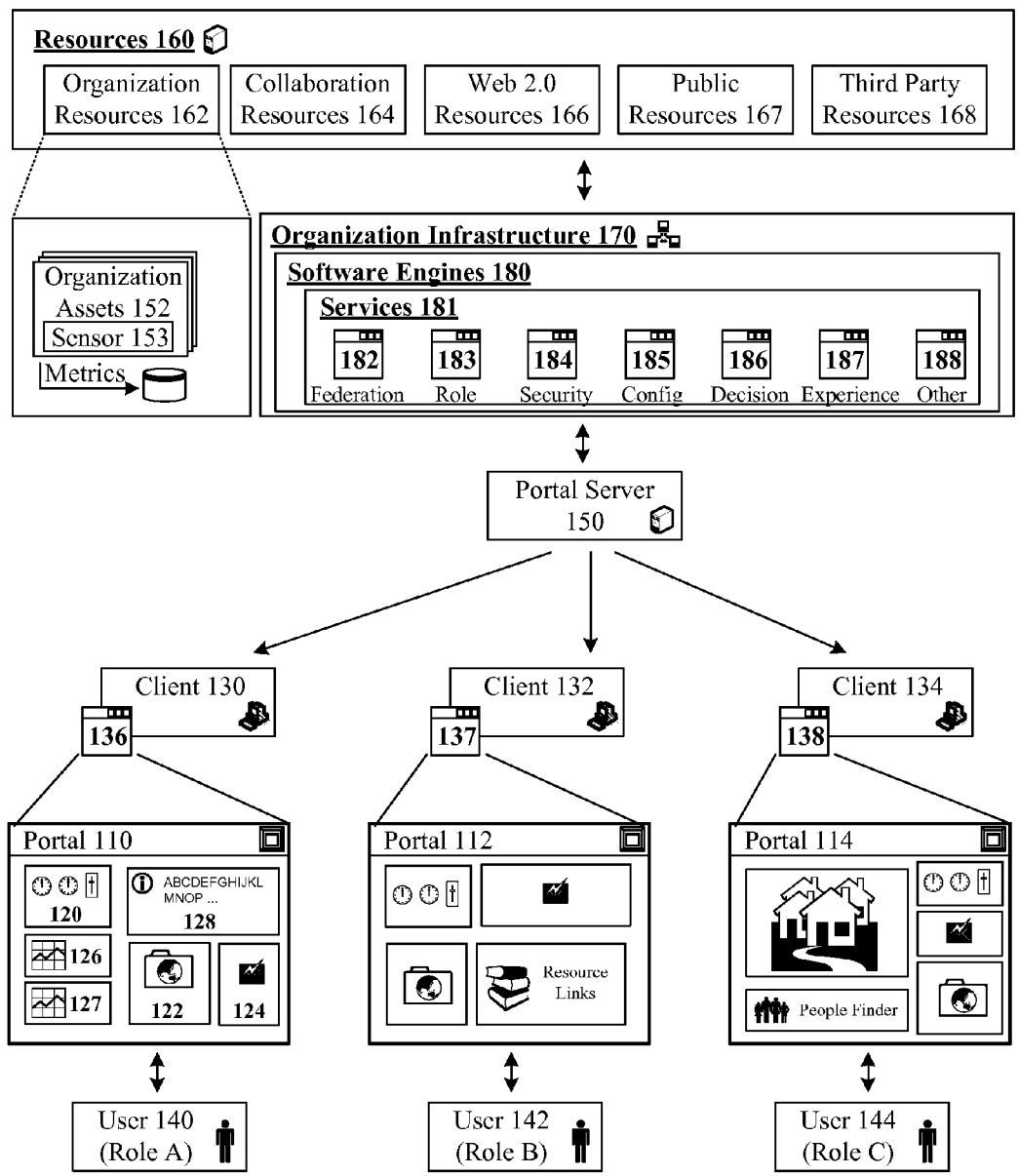
FIG. 1 is a schematic diagram of a system for a role tailored portal having multiple integrated portlets.

FIG. 1 is a schematic diagram of a system 100 for a role tailored portal 110-114 having multiple integrated portlets 120-128. Different portals 110-114 can be served by portal server 150 to different clients 130-134 to be rendered within a client-side browser 136-138. Different portal 110-114 views and data can be tailored for users 140-144 depending upon their role in an organization. Organizational roles can be based upon a hierarchy of organization authority, can be based upon functional lines, and/or can be specific to particular positions. In one implementation of system 100, for example, organizational roles can include operations, supervisory, policy making, and executive roles.

Each portlet 120-128 can present information in a manner that it can be interactively drilled-down to various granularity levels for which a user 140-144 has authority; which can, again, vary by user role. An example of a drill-down operation can be a clicking on a gauge in a metrics reporting portlet 120 to provide more/less detailed information relating to that metric. Content presented in the various portlets 120-128 can be dynamically adjusted based upon content of other portlets 120-128 in accordance with established programmatic rules. These programmatic rules can incorporate business logic of the organization that the portals 110-114 support.

As shown, the portlets 120-128 can include a metrics portlet 120, a Web 2.0 portlet 122, a collaboration portlet 124, a trend portlet 126, a forecasting portlet 127, an alert portlet 128, and the like. Additional portlets 120-128 (not shown) can include, for example, a people finder portlet, a context navigator portlet, a portlet for external data streams (from resources 167 or 168 for example) customized by role, and a media presentation portlet. Different portals 110-114 can be configured to present different portlets based upon user 140-144 configured settings and/or user 140-144 role.

The business logic can be driven by current values of the metrics presented in portlet 120 and how these current values compare against configurable boundaries and ranges of operations. For example, when the metrics deviate from a safe operation range, business logic can trigger an out-of-bounds event. This event can cause alerts to be established in the alert portlet 128, can result in a search of documents relevant to the out-of-bounds event through the Web 2.0 portlet 122, can cause important contact information for available people needed to resolve the out-of-bounds event to appear in the collaboration portlet 124, and the like. In other words, the portals 110-114 can serve as focal points for notifying users 140-144 of out-of-bounds events, for providing necessary information to ensure a quick response, to coordinate this response across organization personnel, and to record an organization response in a reviewable and systematic manner.

Metrics driving this process can be based upon values captured by sensors 153 linked to organization assets 152. These metrics can be stored in real-time and/or near real-time by organization IT resources 162. A set of services 181 can execute, which provide the portal server 150 real-time updates based upon the metrics handled by the organization IT resources 162. Additional services 181 can link other resources 160, such as collaboration resources 164, Web 2.0 resources 166, public resources 167, and third party resources 168 to the portal server 150, where obtained/processed information from all of these resources 160 can be selectively presented within the portals 110-114. Collaboration resources 164 can include instant messaging resources, chat resources, online meeting resources, co-browsing resources, Voice Over Internet Protocol (VoIP) telephony resources, video conferencing resources, and the like used to permit users 140-144 to communicate. The Web 2.0 resources 166 can include, but are not limited to, content management libraries or repositories, WIKIs, BLOGS, syndication feeds, folksonomies, mashups, and the like, which users 140-144 can utilize to share information with other organization users.

As used herein, the portal server 150 can provide data and can function as a communication intermediary between the clients 130-134 and resources or data sources 160. The portal server 150 can provide real-time and/or near real-time information to portlets 120-128, which can require constant updating. The portal server 150 can be optionally implemented as a cluster of portal servers (not shown) to provide redundancy and to enable resilient operation of system 100 should one or more portal servers 150 fail.

Each of the portals 110-114 can represent a Web site or service environment that centrally offers a broad array of resources and information for an organization, such metrics, collaboration resources, contact information, Web 2.0 content, and the like. Each portal 110-114 can include multiple Web portlets 120-128, which can vary by a role of a user.

Each portlet 120-128 can be a reusable Web component that displays information to portal users from a designated source, which can be different from the back-end resource that provides information for the portal. An arrangement of portlets 120-128 within a portal 110-114, a presentation of information within the portal 110-114, the responsiveness of this presentation, and other user perceived factors all contribute to the user experience of the portal 110-114.

Each of the clients 130-134 can be a computing device capable of presenting Web content within a browser 136-138. Each client 130-134 can include, for example, a desktop computer, a server, a mobile telephone, a tablet computer, a personal data assistant (PDA), a digital media player, and the like. Each of the resources 160 can represent an information technology resource, such as one or more back-end systems. One of the organization resources 162 can be sensor 153 equipped organization assets 152. The sensors 153 can capture metrics, which can be stored in a data store, which is accessible by a data federation service 182 or other processing component, which ultimately presents the metrics in a metrics portlet 120 in real-time or near real-time.

Each of the engines 180 can be a software program executing within an organization infrastructure 170 that is able to perform a processing action against data from one or more of the resources 160. Processing results can be delivered to the portal server 150. In one embodiment, the engines 180 can be used to implement one or more software services 181. The services 181 can include, for example, federation services 182, role services 183, security services 184, configuration services 185, decision services 186, experience services 187, or other 188 services. In one embodiment the services 180 can be SOA services linking resources 160 to the portal server 150.

Each of the components of system 100 can be interconnected through a network (not shown). The network can include any hardware, software, and firmware necessary to convey data encoded within carrier waves. Data can be contained within analog or digital signals and conveyed though data or voice channels. The network can include local components and data pathways necessary for communications to be exchanged among computing device components and between integrated device components and peripheral devices. The network can also include network equipment, such as routers, data lines, hubs, and intermediary servers which together form a data network. The networks can further include circuit-based communication components and mobile communication components, such as telephony switches, modems, cellular communication towers, and the like. Additionally, the network can include line based and/or wireless communication pathways.

Additionally, in system 100 digitally encoded information can be stored in a plurality of data stores (not shown) which are accessible by system components. These data stores can be a physical or virtual storage spaces configured to store digital information. The data stores can be physically implemented within any type of hardware including, but not limited to, a magnetic disk, an optical disk, a semiconductor memory, a digitally encoded plastic memory, a holographic memory, or any other recording medium. Each of data stores can be a stand-alone storage unit as well as a storage unit formed from one or more physical devices. Additionally, information can be stored within the data stores in a variety of manners. For example, information can be stored within a database structure or can be stored within one or more files of a file storage system, where each file may or may not be indexed for information searching purposes. Further, the data stores can optionally utilize one or more encryption mechanisms to protect stored information from unauthorized access.

Figure 2:
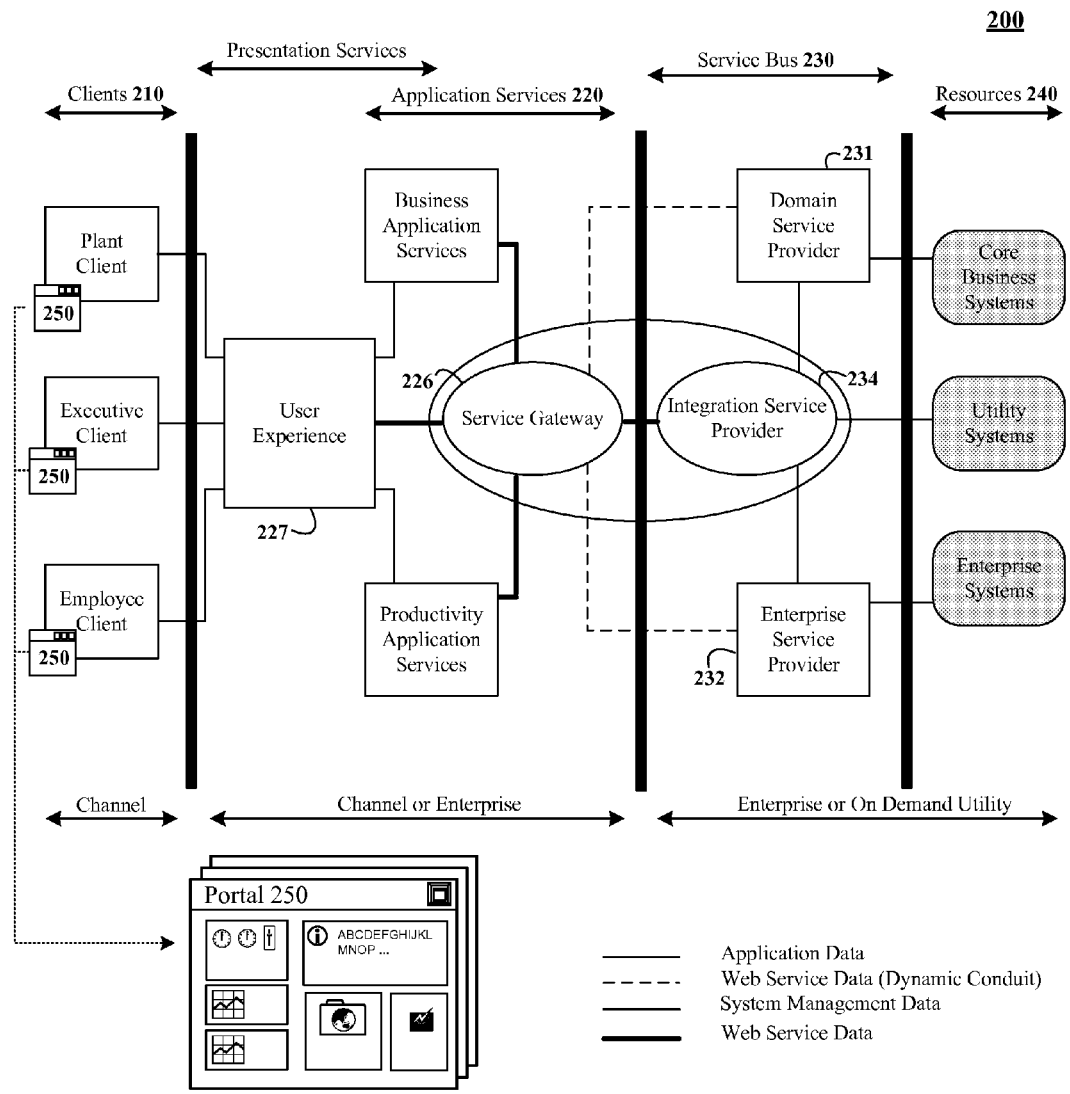
FIG. 2 is a schematic diagram of a service oriented architecture (SOA) implementation required to support a role tailored portal in accordance with an embodiment of the inventive arrangements shown herein.

FIG. 2 is a schematic diagram of a service oriented architecture (SOA) 200 implementation of a role tailored portal 250 in accordance with an embodiment of the inventive arrangements shown herein. The loosely coupled nature of a SOA 200 can be advantageous in connecting back-end resources 240 via a service bus 230 to a service gateway 226 for use by a portal server 227. The SOA 200 environment can also make customizing user experiences for different clients 210 easier than would be possible with a more rigid architecture.

As shown, for example, a portal 250 workplace and its portlets can map to layer 210 of the SOA 200. Multiple user roles and their associated Web browsers can access the presentation and application services 220. The presentation and application services 220 can include the user experience portal server and various support applications, such as an organization directory, instant messaging, and content management (library) systems. The SOA 200 can bifurcate presentation services from application services in zone 220, which can foster configurable end-user experiences, while ensuring consistent handling of organization information.

The resources 240 portion of the SOA can be involved with the provisioning of data required to drive measurements, historical/trending, and marketplace portions of the portal 250 workplace. Various back end, enterprise-level systems can yield direct or to-be-federated (such as by federation service 182) data. Resource 240 contributions must be fetched, coordinated, and appropriately transformed. The use of domain 231 and enterprise 232 service providers allows the isolation and insulation of back end systems (240), while allowing access to their functions via Web Services interfaces. The integration service provider 234 can integrate information from the other service providers 231, 232 and can communicate with a service gateway 226. The service gateway 226 can implement dynamic binding, request/response decomposition/composition, and content-based routing of document-literal Extensible Markup Language (XML) requests generally arriving via Web Services, and provide protocol conversion if necessary.

More specifically, the integration service provider 234 can serve as a reference system for service routing and versioning as well as the handler for complex requests and processes not addressable by the service gateway 226. All of these "middleware" and "back end adapter" components combine to standardize, normalize, and flexibly implement the loose coupling that is a SOA strength. All serve to optimize the presentation and application services 220 access to back end systems 240; the middleware components 230 may be used to cache fetched data to preempt full round trips (portal 250 to back end resources 240) where possible.

Taking the above into account, and for the portal 250 workplace, the presentation and application services 220 (largely implemented with a the portal server and collaboration technology). The portal server can use client libraries for the conversion of Java Bean-based requests into document-literal XML ones, which are transmitted to the service gateway 226 for decomposition (many to individuals) and routing. When the near-real-time "dial gauges" are generating requests via AJAX, those end up being transmitted via Web services calls to the service gateway 226 which enables access to data cached in the service bus 230 or requested of the appropriate resource 240. Responses can be sent back to the service gateway 226, which will cache appropriate data and compose a total response to match all facets of the original request. Subsequent requests can be matched with cached data before it expires, thereby extending the time before another "full round trip" through the service provider is necessary.

The same approach as above is taken for the "marketplace" portion of the portal 250 workplace, as data relating to trading (for example, emissions credits or offsets) and allowance accounts is accessed once again through the user experience 227, the service gateway 226, possibly the ISP 234 and an appropriate service provider 231-232.

In the cases where multiple service providers 231-232 and back-end systems 240 must contribute to federated responses or multi-step business processes must be run for analysis or aggregation purposes, the integration service provider 234 can be utilized. Possessing business process choreography capabilities, the integration service provider 234 is able to handle requests involving conversions and synthesis the service gateway 226 cannot. As response routing does go back through the service gateway 226, however, the ability to capture complex results in cache is still present, and can be leveraged for subsequent requests. An example of a request requiring aggregation of data from various back-end resources is when portal 250 workplace fetches its past, present, and future information in one request for a historical/trending portlet. The integration service provider 234 provides the breakdown and steps required to access each contributing back end system, and then aggregates the responses to form one "answer."

In summary, the "visible" portion of the portal 250 workplace leverages the "invisible" portion provided by the SOA infrastructure 220, 230 and 240 in order to access the various pieces of data required to drive its mix of portlets. The employment of client-side Java Beans for convenience, document-literal XML, content-based routing, dynamic binding, multi-step request handling, and Web services enablement of back ends contributes to this goal.

It should be emphasized that the architecture 200 is shown for illustrative purposes only and that the scope of the invention is not to be limited in this regard. For instance, other SOA architectures not having an integration service provider 234 component can be used to implement the portal 250 functionality. Other architecture types, such as a RESTful architecture, can also be used to implement portal 250 functionally in different invention embodiments.

Figure 3:
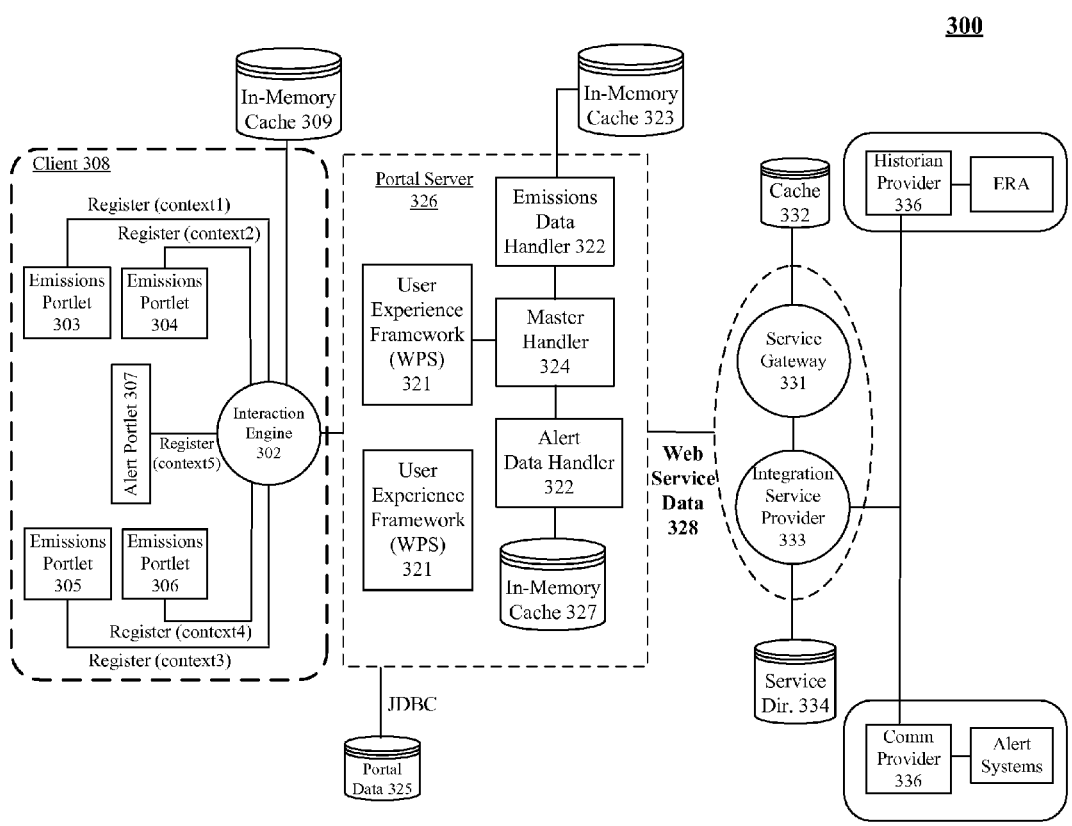
FIG. 3 is a schematic diagram of a portal based emissions system showing a specific implementation of SOA architecture for a role tailored portal.

FIG. 3 is a schematic diagram of a system 300 showing a specific implementation of SOA 200 in a context of an emissions dashboard solution. That is, emissions specific metrics can be presented within emissions portlets 303-306 in a configurable fashion. An interaction engine 302 can compare current emissions metrics against previously defined boundaries to determine if an out-of-bounds event has occurred. If so, an alert to this effect can be posted to an alert portlet 307. Additionally, other portlets (not shown) can respond to the out-of-bounds event. The client 308 upon which the portal is associated can optionally utilize an in-memory cache 309 to improve performance, which can be a significant factor since the emission metrics are to be presented in real-time or near real-time.

For example, each portlet 303-307 of client 308 can utilize interaction engine 302 to interface with the portal server 326. In-memory cache or data store 309 can be used to store information specifying data sources for updating the portlets 303-307, such as URLs for associated Web sites. Data store 309 can also separately store and track foreground (presented) version information for the portlets 303-307 and background (hidden) version information.

The portal server 326 of system 300 can include a user experience framework 321, a master handler 324, a emissions data handler 322, and an alert data handler 322. Caches 323, 327 and data store 325 contain information which can also be used by the portal server 326. The client 308 can communicate with portal server 326 via a network infrastructure (not shown). Authorization engines (not shown) can ensure security of portlet data.

User experience framework or engines 321 can interface with specific clients 308. The user experience engines 321 can be communicatively linked to registration handler (not shown), master handler 324, and data handlers 322, as shown. Each data handler 322 can be associated with a memory cache 323 and/or 327, which stores frequently updated data and other pertinent update frequency information. Handlers can together ensure that data presented within client 308 portlets and obtained from providers 336 is continuously updated.

In one embodiment, user experience engines 321 can customize enterprise content for specific user roles or communication channels, such as a customer channel, an employee channel, a management channel, an IT administrator channel, and the like. The communication channels can also be linked to different market channels, such as employee systems, kiosks, self-service Web sites, and the like. Accordingly, the user experience engines 321 can customize streams of enterprise data obtained from an enterprise infrastructure for different front-end systems. Segmenting enterprise data from different front end systems used by clients 308 in such a loosely coupled fashion ensures that enterprise data can be utilized by different separately customizable systems without negatively affecting back-end systems.

Information can be conveyed as Web service data 328 to the portal server 326 via a service gateway 331, which is connected to an integration service provider 333. Other providers 336 can exist, which communicate with the gateway 331 and/or the integration service provider 333. A service directory 334 can specify the types of services available to system 300. Middleware components 331, 333 can optionally use one or more memory cache 332 to improve system 300 performance.

Figure 4:
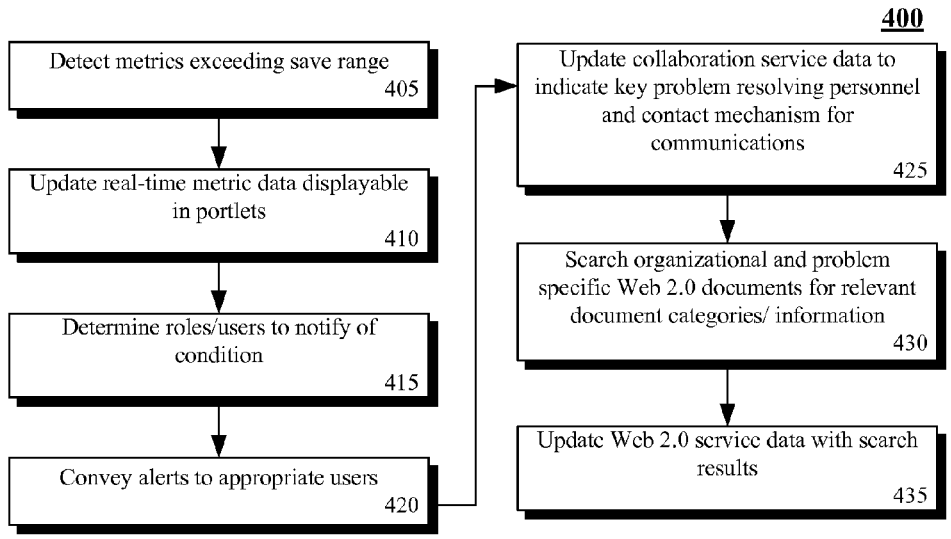
FIG. 4 is a flow chart of a method for customizing portal content based upon metric values, such as when an out-of-bounds event occurs.

FIG. 4 is a flow chart of a method 400 for customizing portal content based upon metric values, such as when an out-of-bounds event occurs. The method 400 can be performed in the context of system 100.

Method 400 can begin in step 405, where a portal service (e.g., decision service 186) can detect that current metrics exceed a safe range defined using previously established boundary values, which can be user configured. This detection can trigger an out-of-bounds event. In step 410, a data store (such as cache 323) can be updated with the metric data, which ultimately results in this data being displayed within client portlets in near real-time. In step 415, a set of roles/ users that are to be notified of the occurrence of the out-of-bounds event can be determined. In step 420, alerts can be conveyed to appropriate users determined in step 415. Alerts can be presented within an alert portlet (e.g., portlet 128) of a portal workplace 110-114 or can be automatically conveyed through another means.

Different contact rules and mechanisms can be established to more aggressively contact key users depending on the severity of the out-of-bounds event and its significance to an organization. For example, when the out-of-bounds event is routine, the alert portlet alone can be a contact mechanism of choice. When an out-of-bounds event is highly significant, email, fax, text messages, voice messages, paging, and the like can be used to contact suitable response personnel and to inform them of the occurrence of the out-of-bounds event. This can enable the contacted user to go online and receive more detailed information via a customized portal.

In step 425, collaboration service data can be updated to indicate key problem resolving personnel and contact mechanisms for communications. For example, a plant manager can instantly be presented with contact information via a collaboration portal that shows maintenance personnel qualified to resolve the out-of-bounds event. Collaboration services can also indicate availability of key decision makers, who are to be contacted (such as through a group chat session) to ensure a rapid and coordinated response. In step 430, a Web 2.0 repository of documents can be searched for relevant information relating to the out-of-bounds event. This information can be placed in a data store in step 435, which can be used to populate Web 2.0 portlets for appropriate personnel.

For example, a plant manager can be presented with a WIKI detailing proper plant-level protocol for responding to the out-of-bounds event. A maintenance worker logging onto the organization portal can be presented with maintenance manuals, repair BLOG entries, and the like relevant for his/her tasks in resolving the out-of-bounds event. This example shows that information provided in a portal related to the out-of-bounds event can be role tailored to be relevant for a particular user.

Figure 5:
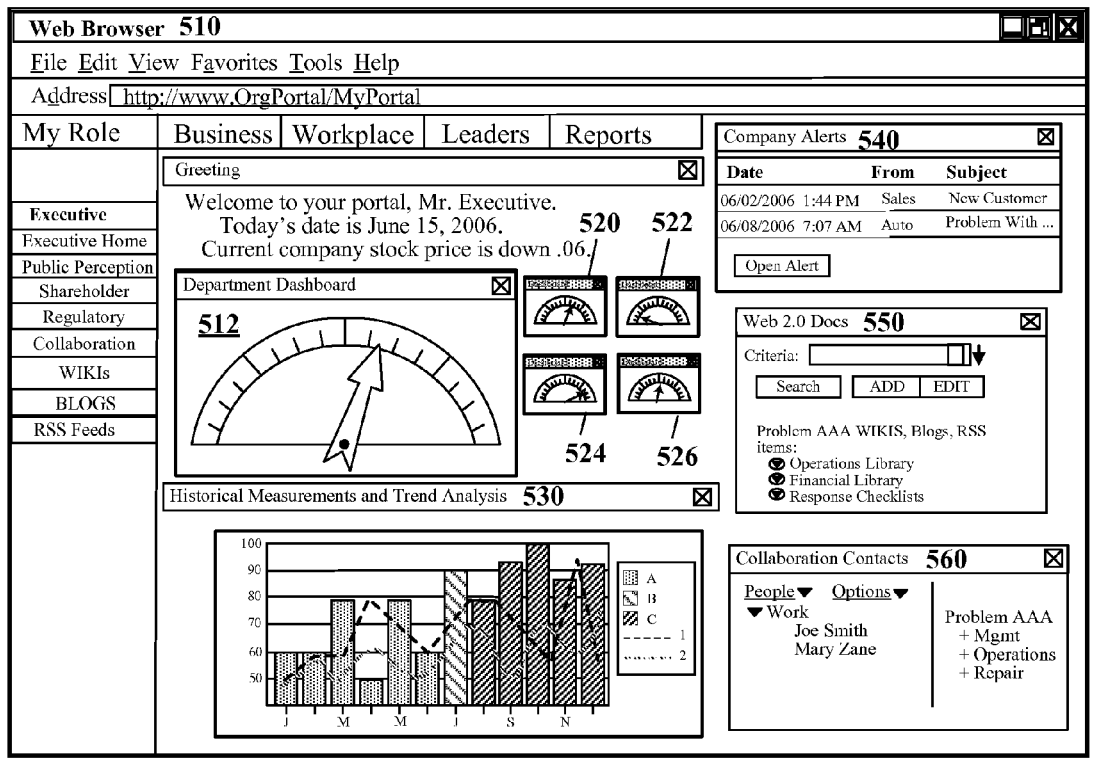
FIG. 5 shows a sample role tailored portal interface for integrating near real-time metrics, business logic, online collaboration, and Web 2.0 content in accordance with an embodiment of the inventive arrangements disclosed herein.

FIG. 5 shows a sample role tailored web browser or portal interface 510 for integrating near real-time metrics, business logic, online collaboration, and Web 2.0 content in accordance with an embodiment of the inventive arrangements disclosed herein. The interface 510 can be an instance specific example of portal 110-114 from system 100. That is, the portal shown in interface 510 can provide a roles based, tailored user experience for ensuring compliance with the previously established boundaries for the near real-time metrics. Different roles supported by the Web portal interface 510 can include, for example, operations, supervisory, policy making, and executive roles. Each role can have different data needs that are expressed within the interface 510 in a role specific manner.

As shown, interface 510 can include a set of metric portlets 512, 520, 522, 524, and 526, each able to present real-time or near real-time metrics. Metric portlets 512, 520, 522, 524, and 526 can include graphical widgets that show current values relative to "normal" operational boundary conditions. Data presented in the portlets 512, 520, 522, 524, and 526 can be based upon sensor readings and/or a federation of data from multiple sources. The metric portlets 512, 520, 522, 524, and 526 are not limited to graphical expressions, and tables of data, charts, summaries, and the like can also be presented. In one embodiment, each of the metric portlets 512, 520, 522, 524, and 526 can be configured to drill-down to various levels of detail.

Portlet 530 is a historical measurement and/or trend analysis portlet, which presents historic information related to the near real-time metrics and/or presents forecast information related to the near real-time metrics. Portlet 530 information can quickly permit a user to put current metric values in context, which can facilitate making an appropriate and timely response to an out-of bound event or to a situation likely to result in an out-of-bounds event.

The alerts portlet 540 can automatically present a notification to a set of organization associated users whenever the near real-time metrics exceed the set of previously established boundaries. Other organization personnel can also post alerts 540 directed towards specific users and/or user groups.

The Web 2.0 portlet 550 can be used to access a set of shared documents relevant to an organization. Entries available through portlet 550 can be designed to provide insight required to make tactical and strategic decisions to achieve metric driven value targets, to maintain the near real-time metrics within safe operational ranges relative to the set of previously established boundaries, and/or to otherwise conduct user specific organization tasks.

The collaboration portlet 560 can facilitate communications among organization associated users through various online and external communication channels.

The portlets shown in interface 510 are not intended to be comprehensive. Additionally, design choices for interface 510 are arbitrary and use of other design choices falls within the scope to the disclosed invention.

Figure 9:
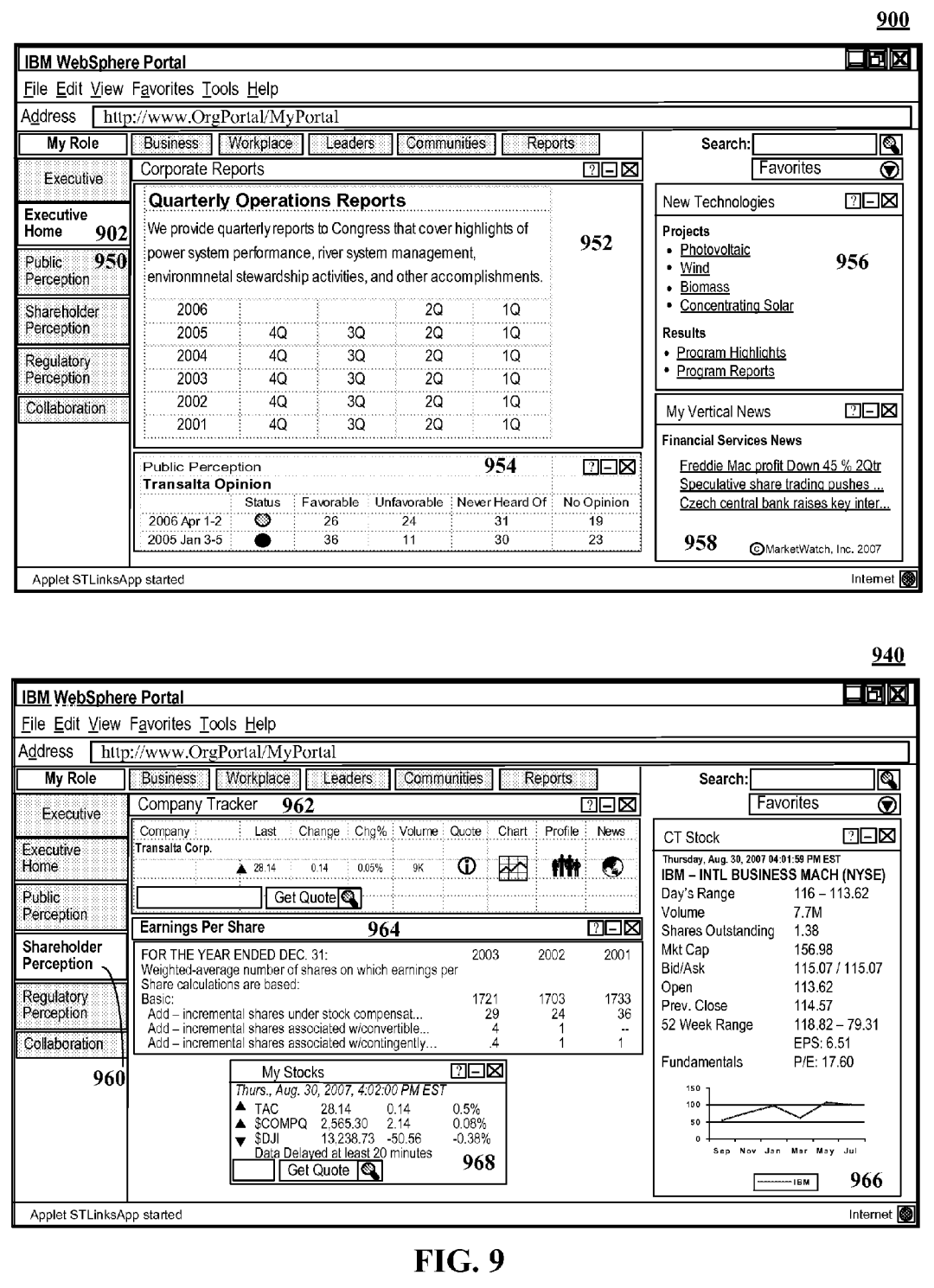

FIGS. 6, 7, 8, and 9 show sample portal interfaces for an emissions dashboard portal, which is one of many contemplated/potential uses for the disclosed invention. The portal interfaces of FIGS. 6, 7, 8, and 9 specifically show several renderings of an emissions dashboard portal to correspond to a number of different supported user roles. These roles include a plant-level operator (FIG. 6), a plant manager (FIG. 7), a mid-level policy making user (FIG. 8), and an executive level user (FIG. 9). The elements and concepts expressed for the emissions dashboard example should be broadly interpreted to be applicable to any metrics driven portal.

Figure 6:
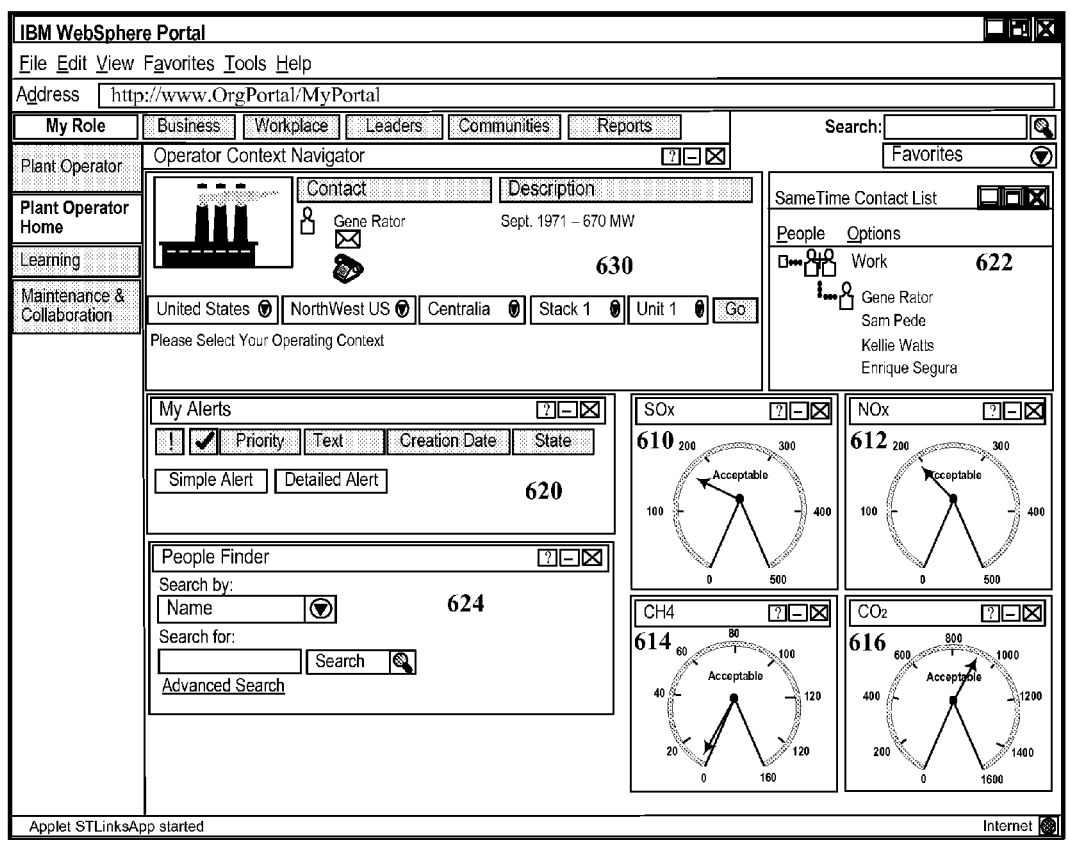
FIG. 6 illustrates a role tailored emissions "dashboard" portal configured for a plant level operator role in accordance with an embodiment of the inventive arrangements disclosed herein.

FIG. 6 illustrates a role tailored emissions dashboard portal 600 configured for a plant unit level operator role in accordance with an embodiment of the inventive arrangements disclosed herein. A plant level operator can be concerned with an overall status of unit within a plan. Hence, the portal 600 can be configured to provide an overview of unit performance in the context of the local plant.

Portal 600 can include a set of emissions portlets 610-616, an alert portlet 620, an Instant Messaging (collaboration) portlet 622, a people finder portlet 624, and a navigation portlet 630.

Figure 7:
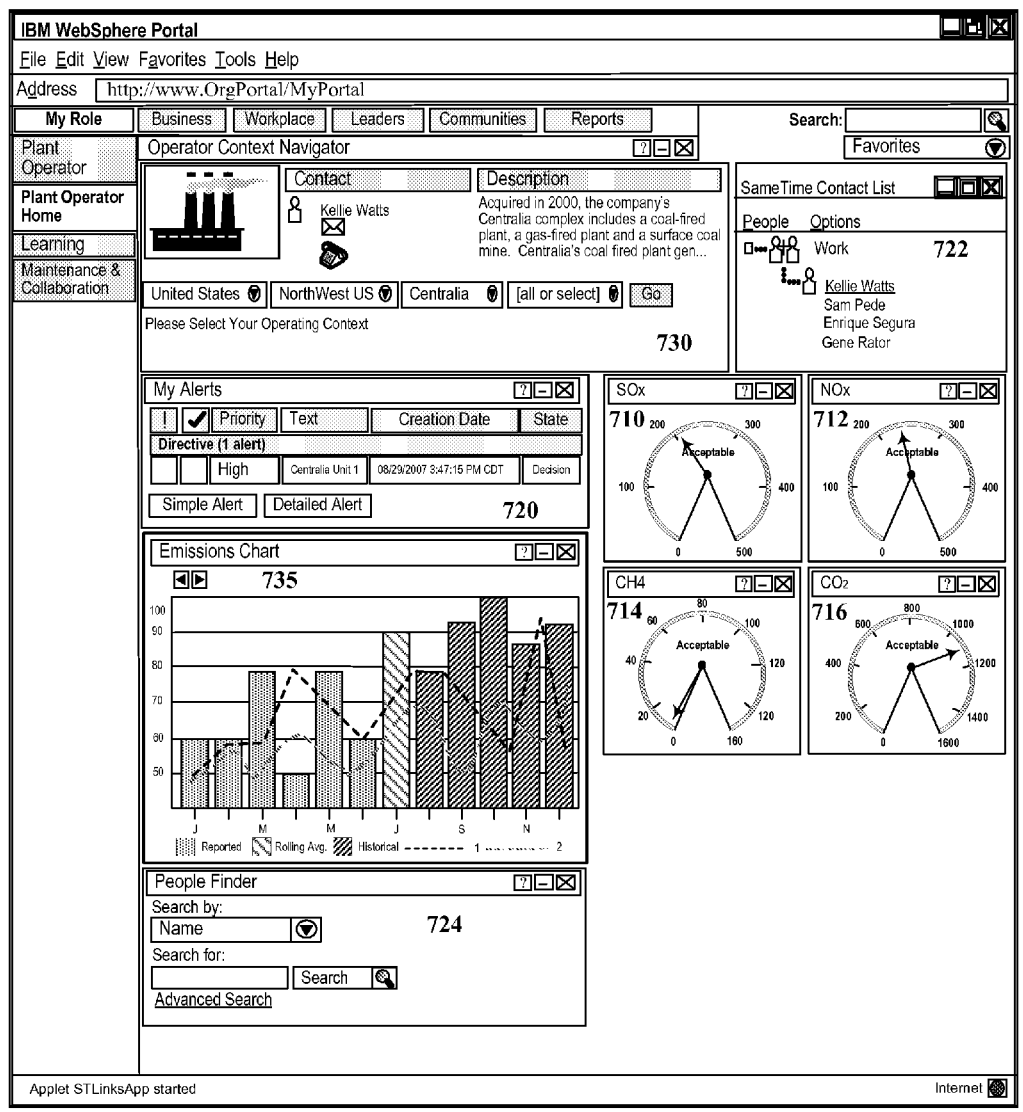
FIG. 7 illustrates a role tailored emissions dashboard portal configured for a plant manager role in accordance with an embodiment of the inventive arrangements disclosed herein.

FIG. 7 illustrates a role tailored emissions dashboard portal 700 configured for a plant manager role in accordance with an embodiment of the inventive arrangements disclosed herein. Although portal 700 can be similar to portal 600, a plant manager can be more concerned with broader details of his/her plant as well as broader organizational matters than a plant operator.

As shown, portal 700 can include a set of emissions portlets 710-716, an alert portlet 720, an Instant Messaging (collaboration) portlet 722, a people finder portlet 724, a navigation portlet 730, and a historical emissions portlet 735. Content contained in each portlet 710-730 can vary from content of portlets 610-630, due to the different role. For example, a set of alerts directed towards plant operators can be different than a set of alerts for plant managers. The addition of the historical emissions portlet 735 illustrates an increased focus on overall plant details for portal 700 compared to portal 600.

Figure 8:
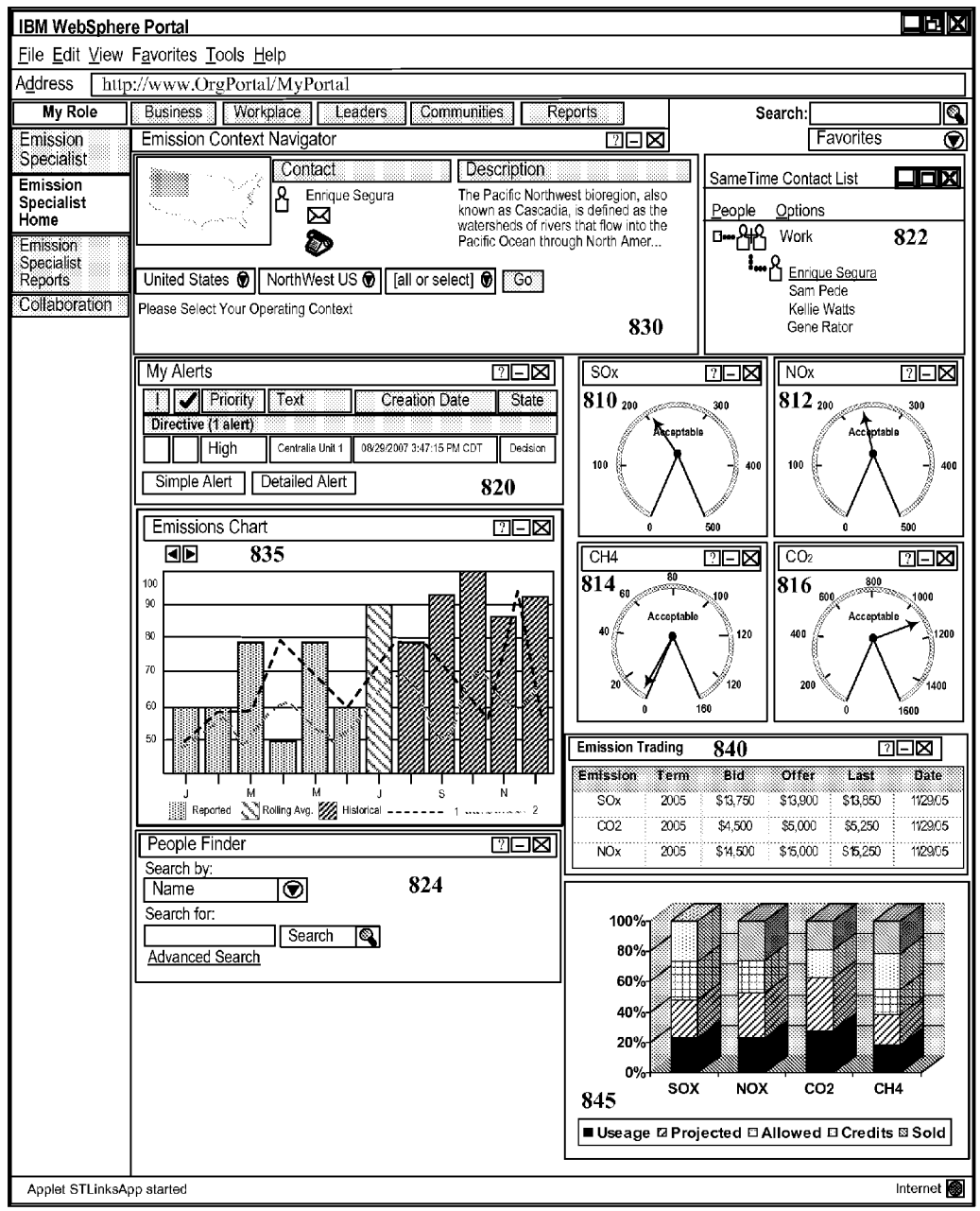
FIG. 8 illustrates a role tailored emissions dashboard portal configured for a policy maker role in accordance with an embodiment of the inventive arrangements disclosed herein.

FIG. 8 illustrates a role tailored emissions control portal configured for a policy maker user role in accordance with an embodiment of the inventive arrangements disclosed herein. More specifically, the policy maker role can be a financial one concerned with emissions offset trading shown by portlet 840 and concerned with emissions accounts shown by portlet 845. The remaining portlets 810-835 can be identical in nature to those of portal 700, other than the presented content is tailored for a different user having a different role within the organization.

FIG. 9 illustrates a role tailored emissions control portal 900, 940 configured for an executive level user role in accordance with an embodiment of the inventive arrangements disclosed herein. FIG. 9 shows a selection of a portal tab 950, 960 other than a home tab 902, which is shown for FIGS. 6-8. The home tab 902 for FIG. 9 can present equivalent portlets to those of portlet 800 other than having content tailored for a different role and user.

When a public perception tab 950 of portal 900 is selected by an executive level user, interface 900 can be presented. Interface 900 can include a quarterly report portlet 952, a public perception portlet 954, a new technologies portlet 956, and a news portlet 958 concerned with public perception.

When a shareholder perception tab 960 of portal 900 is selected, interface 940 can be presented. Interface 940 can show a company stock tracker portlet 962, an earnings per share portlet 964, an organization stock report portal 966, and a user's stock portfolio portlet 968.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A metrics driven method for presenting data within a portal comprising:
logging a user into an organization portal;
determining an organization role for the user;

graphically presenting within a metrics portlet of the organization portal, near real-time or other metrics tailored for the determined organization role;

providing online collaboration capabilities through a collaboration portlet of the organization portal, which are tailored for the determined organization role;

permitting data sharing among organization users through a Web 2.0 portlet of the organization portal, which is tailored for the determined organization role;

determining relationships among the users in the determined set to determine collaborations among users that are potentially beneficial for resolving an out of bounds event; and altering content of the collaboration portlet to include collaboration items in accordance with the determined relationships to present the user with the determined set of collaborators specific for the out of bounds events, wherein the collaboration capabilities of the collaboration portal permit the user to select any of the presented set of collaborators from the user interface and to electronically communication via the portal with any selected ones of the collaborators.

2. The method of claim 1, further comprising:

receiving a user selection to drill down the metrics portlet; and responsive to the user selection presenting metric specific information at a lower level than originally presented within the metrics portlet, wherein the lower level metrics are tailored for the determined organization role.

3. The method of claim 1, further comprising:

detecting that the near real-time metrics exceeds a previously established boundary condition;

triggering an out-of-bounds event;

programmatically determining a set of users of the organization portal which are to be apprised of an occurrence of the out-of-bounds event;

constructing role specific alert messages for each user in the determined set; and presenting within user specific versions of the organization portal the constructed alert messages.

4. The method of claim 3, further comprising:

searching a Web data repository for items specific to the out-of-bounds event, wherein said search software is triggered by an occurrence of the out-of-bounds event; and altering content of the Web 2.0 portlet to include items from the Web data repository that result from the searching step.

5. The method of claim 1, wherein the organization portal is served by a portal server, wherein the portal server is part of a service oriented architecture (SOA), wherein the near real-time metrics are conveyed from a resource, to a middleware service provider, to a service gateway, and then to the portal server.

6. The method of claim 1, wherein said steps of claim 1 are performed by at least one machine in accordance with at least one computer program stored in a computer readable media, said computer programming having a plurality of code sections that are executable by the at least one machine.

7. A portal server comprising:

a plurality of organization role specific programmatically implemented customizations, stored in at least one non-transient storage medium, for providing organization role tailored portals to a set of authorized users of an organization;

fetching software, stored in at least one non-transient storage medium, configured to obtain near real-time metrics from at least one back-end resource;

metric software, stored in at least one non-transient storage medium, configured to graphically indicate values of the near real-time metrics within a portlet of a served organization Web portal;

collaboration software, stored in at least one non-transient storage medium, configured to conduct online collaboration communications responsive to a user selection from within a portlet of the served Web portal; and Web 2.0 software, stored in at least one non-transient storage medium, configured to grant access to a shared organization resource from within a portlet of the served Web portal, wherein different organization roles supported by said organization role specific programmatically implemented customizations comprise operations, supervisory, policy making, and executive roles, each role having different data needs that are expressed within said served Web portal in a role specific manner.

8. The portal server of claim 7, wherein the fetching software, the metric software, the collaboration software, and the Web 2.0 software are implemented as Web services.

9. The portal server of claim 7, wherein the portal server is part of a service oriented architecture (SOA), wherein the near real-time metrics are conveyed from a resource, to a middleware service provider, to a service gateway, and then to the portal server.

10. The portal server of claim 7, further comprising:

software, stored in at least one non-transient storage medium, configured to detect when obtained near real-time metrics have exceeded a previously established boundary, which triggers an out-of-bounds event; and software, stored in at least one non-transient storage medium, configured to present an alert within a portal of the served Web portal responsive to an occurrence of the out-of-bounds event.

11. The portal server of claim 10, further comprising:

search software, stored in at least one non-transient storage medium, configured to search a Web 2.0 data repository for items specific to the out-of-bounds event, wherein said search software is triggered by an occurrence of the out-of-bounds event, wherein said Web 2.0 software alters content of a portlet of the served Web page to include results produced by the search software.

12. The portal server of claim 10, further comprising:

contact querying software, stored in at least one non-transient storage medium, configured to search an organization directory for a set of personnel associated with responding to the out-of-bounds event, wherein said collaboration software alters content of a portlet served of the served Web portal to include results produced by the contact querying software.

13. A server comprising hardware and software, where execution of the software on the hardware causes the server to serve a Web portal comprising a plurality of portlets, said portlets comprising:

at least one metrics portlet configured to present near real-time metrics relative to a set of previously established boundaries and value targets that are significant to an organization;

at least one Web 2.0 portlet configured to share information among organization associated users, said shared information comprising searchable content repositories of user provided and updated information designed to provide insight required to make tactical and strategic decisions to achieve the value targets and to maintain the near real-time metrics within safe operational ranges relative to the set of previously established boundaries;

at least one collaboration portlet configured facilitate communications among organization associated users to permit said users to rapidly respond to deviations in the real-time metrics relative to a desired range of values and to adjust organization assets to restore the real-time metrics to values within the desired range as rapidly as possible, wherein said Web portal provides an organization roles based, tailored user experience for ensuring compliance with the previously established boundaries for the near real-time metrics;

at least one alert portlet configured to automatically present a notification to a set of the organization associated users whenever the near real-time metrics exceed the set of previously established boundaries, wherein said set of organization associated users are indicated within a data store to be individuals responsible for taking corrective actions in regard to a situation indicated by the notification, wherein when the notification is presented, the collaboration portlet automatically presents communication specific items for each of said indicated set of organization associated users, and wherein when the notification is presented, the Web 2.0 portlet automatically presents documents from the content repository related to the indicated situation and relevant as determined by a set of programmatic rules to an organization role of the user of the Web portal.

14. The server for serving the Web portal of claim 13, said Web portal further comprising:

at least one historical measurement and trend analysis portlet configured to present historic information related to the near real-time metrics and to present forecast information related to the near real-time metrics.

15. The server for serving the Web portal of claim 13, wherein said server is a portal server, wherein said portal server utilizes a plurality of services to communicate content from a set of back-end resources to a portal server.

16. The server for serving the Web portal of claim 13, wherein different organization roles supported by said Web portal comprise operations, supervisory, policy making, and executive roles, each organization role having different data needs that are expressed within said Web portal in a role specific manner.

17. The server for serving the Web portal of claim 13, further comprising:

a software program ,stored on a non-trasnitory storage medium, that fires an out-of-bounds event when the near real-time metrics exceed the previously established boundaries, wherein an automated programmatic action altering content in the Web 2.0 portlet and the collaboration portlet is triggered by a detection of the out-of-bounds event, wherein the content altering is designed to facilitate a resolution of the out-of-bounds event.

* * * * *